G. A. FARRALL & C. MAUL.
CORN HARVESTER.
APPLICATION FILED JUNE 4, 1914.
1,158,470. Patented Nov. 2, 1915.
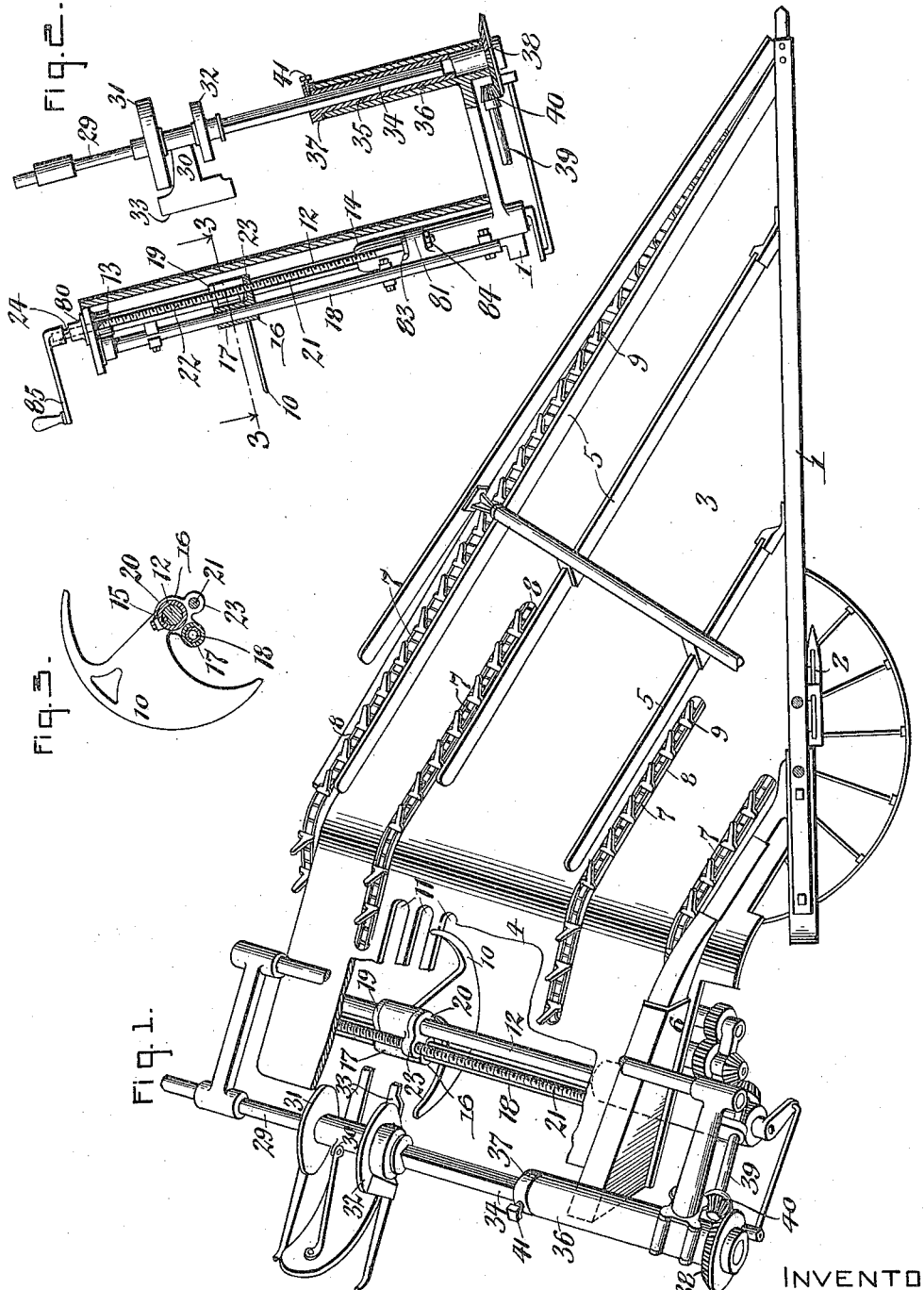
WITNESSES
W. Ray Taylor
Julius J. Prible
INVENTORS
George A. Farrall
Christian Maul
by Geyer & Popp
ATTORNEYS

UNITED STATES PATENT OFFICE.

GEORGE A. FARRALL AND CHRISTIAN MAUL, OF BATAVIA, NEW YORK, ASSIGNORS TO THE JOHNSTON HARVESTER COMPANY, OF BATAVIA, NEW YORK, A CORPORATION OF NEW YORK.

CORN-HARVESTER.

1,158,470.  Specification of Letters Patent.  Patented Nov. 2, 1915.

Application filed June 4, 1914. Serial No. 842,867.

*To all whom it may concern:*

Be it known that we, GEORGE A. FARRALL and CHRISTIAN MAUL, citizens of the United States, residing at Batavia, in the county of Genesee and State of New York, have invented new and useful Improvements in Corn-Harvesters, of which the following is a specification.

This invention relates more particularly to corn harvesters of the class shown and described in Letters Patent of the United States #657,651, granted September 11, 1900.

It is the object of this invention to provide simple, efficient and easily operable means whereby the needle may be readily and quickly adjusted to any position between the limits of two predetermined points for the purpose of enabling the binding band to be applied around the most desirable place of the bundles of corn stalks regardless of the length of the same.

In the accompanying drawings: Figure 1 is a fragmentary side elevation of a corn harvester viewed from the grainward side and containing our invention. Fig. 2 is a vertical transverse section of the same taken through the binder mechanism. Fig. 3 is a horizontal section in line 3—3, Fig. 2.

Similar characters of reference indicate corresponding parts throughout the several views.

1 represents the main frame of the corn harvester which may be of any suitable construction to support the various movable parts of the machine and which is supported on the ground while being hauled over the same by means of wheels in the usual and well known manner. On the lower front portion of the main frame the same is provided with the usual cutter mechanism 2 whereby the corn stalks are cut off during the forward movement of the machine. Arranged lengthwise on the main frame is the inclined conveyer platform 3 which extends rearwardly from the cutter mechanism on the stubbleward side thereof and has its lower portion near the grainward side of the machine while its upper portion is nearer the stubbleward side of the machine. Extending rearwardly and stubbleward from the rear end of the conveyer platform is the inclined binder deck 4. This deck and the platform together constitute the stubbleward side of the passage or throat through which the stalks pass rearwardly through the machine after being severed by the cutter, the grainward side of this throat or passage being formed principally by longitudinal bars 5 supported on the adjacent part of the main frame. In passing through the throat the corn stalks are supported at their lower or butt ends by a bottom 6 extending rearwardly and upwardly along the rear part of the conveyer platform and the lower part of the binder deck.

The corn stalks are carried in an upright position through this throat from the cutter mechanism to the binder mechanism which is mounted adjacent to the binder deck by means of a conveyer mechanism which may be of any suitable construction but which preferably comprises a plurality of feed belts 7 having their operative stretches passing rearwardly through longitudinal slots 8 in the platform and binder deck and provided with feeding teeth or wings 9 which project laterally from these belts into the stalk passage or throat so that they engage the corn stalks and move the same rearward positively.

10 represents the binder needle which is arranged in rear of the binder deck while in its inoperative position and which is adapted to pass back and forth through one or another of a vertical series of slots 11 in the deck and coöperate with the knotter mechanism arranged on the opposite side of the stalk throat for tying the band, twine or cord around the bundle of stalks. The mechanism for imparting this movement to the needle may be of the usual and well known character and the same is therefore not shown in the drawings. This needle is mounted on an upright rock shaft 12 which is arranged on the under or rear side of the binder deck and journaled at its upper and lower ends in stationary bearings 13, 14 arranged on the adjacent part of the main frame. The needle is mounted on this shaft by means of a spline 15, as shown in Fig. 3, or otherwise, so that the needle is compelled to rock with this shaft but is capable of sliding lengthwise thereon for the purpose of permitting the needle to be shifted vertically into different positions relatively to the bottom of the stalk throat. Various means may be provided for shifting the needle to any point between predetermined limits on its actuating shaft 12 for the purpose of adapting the needle to the length of the corn which is being bound. The preferred means for this purpose which are shown in the drawings comprise a carriage having a vertical guide sleeve 17 which is movable vertically on an upright stationary guide rod 18 arranged on the main frame adjacent to the needle shaft 12 and two arms 19, 20 projecting laterally from the upper and lower ends of the guide sleeve and provided with eyes or openings which receive the needle shaft 12 at the upper and lower ends of the hub of the needle, as shown in Figs. 1 and 2, whereby upon raising or lowering the carriage the needle will be compelled to move therewith. The vertical movement of the carriage and the needle associated therewith is preferably effected by means of an upright screw shaft 21 arranged in rear of the binder deck and parallel with the needle shaft and journaled at its upper and lower ends in suitable bearings on the main frame while its intermediate part is provided with an external screw thread 22 which engages with a screw nut or internally threaded lug 23 formed on the lower arm of the needle carriage 16, as shown in Figs. 2 and 3. The screw shaft is preferably held against axial movement by a collar 83 arranged thereon and engaging the upper side of its lower bearing 81 and screw nut 84 applied to the lower end of this shaft and engaging with the underside of said bearing, as shown in Fig. 2. Upon turning the screw shaft 21 in one direction the needle carriage will be raised while upon turning this shaft in the opposite direction the needle carriage will be lowered. The turning of the screw shaft may be effected by applying a wrench 85 of suitable construction to the squared upper end 24 of the screw shaft. This adjustment of the needle can be made while the operator is occupying his seat which is arranged adjacent to this screw shaft. By means of this adjusting mechanism the needle can be shifted vertically anywhere between the extremes of its adjusting movement thereby enabling the band to be applied to any desired part of a bundle of stalks as best suits the length of the particular stalks.

The knotter mechanism may be of the usual and well known construction the parts shown in the drawings for locating the same comprising an upright knotter shaft 29 arranged opposite the face of the binder deck, a knotter frame 30 mounted loosely on the knotter shaft opposite the binder needle, upper and lower knotter cams 31, 32 arranged on the knotter shaft above and below the knotter frame and a breast plate 33 mounted on the inner part of the knotter frame. The lower part 34 of the knotter shaft is arranged within an upright bearing sleeve 35, the connection between these parts being of such a character that the knotter shaft is compelled to turn with the bearing sleeve but is free to slide vertically therewith, this being preferably effected by making the lower part of the knotter shaft square in cross section and the bore of the bearing sleeve of corresponding form, as shown in Fig. 2. The bearing sleeve is journaled in an upright bearing or standard 36 mounted on the main frame and is held against vertical movement by means of a collar or flange 37 arranged at the upper end of the bearing sleeve and engaging with the upper end of the bearing 36 and a gear wheel 38 secured to the lower end of the bearing sleeve and engaging with the lower end of the bearing 36, as shown in Fig. 2. The knotter shaft, the bearing sleeve and the parts associated therewith may be turned in the proper direction for operating the knotter mechanism by any suitable means, for instance, by means of a horizontal driving shaft 39 journaled on the main frame below the throat bottom and provided with a bevel gear pinion 40 which meshes with the teeth of the gear wheel 38. By means of this connection between the knotter mechanism and the driving mechanism it is possible to shift the knotter mechanism into any position vertically between its upper and lower limits to coincide with the position of the needle, thereby enabling the binder mechanism to be located for properly binding bundles of corn stalks which vary considerably in length and still permit of placing the band at the most desirable place around the same. The vertical adjustment of the knotter mechanism may be accomplished by various means those shown in the drawings being suitable and consisting of a clamping screw 41 arranged in the collar 37 and engaging with the knotter shaft.

We claim as our invention:

1. A harvester comprising a binder deck, a feeding mechanism for moving the stalks past said deck, and a binder mechanism comprising a needle movable across the path of said stalks, an operating shaft on which said needle is mounted to turn therewith but is capable of sliding lengthwise, and means for adjusting said needle lengthwise on said shaft comprising a carriage having arms engaging with opposite ends of the hub of said needle and provided with a screw threaded opening, and an adjusting screw shaft having its thread engaging with said threaded opening of the carriage and capable of rotation but incapable of axial movement.

2. A harvester comprising a binder deck, a feeding mechanism for moving the stalks past said deck, and a binder mechanism comprising a needle movable across the path of said stalks, an operating shaft on which said needle is mounted to turn therewith but is capable of sliding lengthwise, and means for adjusting said needle lengthwise on said shaft comprising a carriage having arms engaging with opposite ends of the hub of said needle and provided with a screw threaded opening, an adjusting screw shaft having its thread engaging with said threaded opening of the carriage and capable of rotation but incapable of axial movement, and a guide rod on which said carriage is slidably mounted.

3. A harvester comprising a binder deck, a feeding mechanism for moving the stalks past said deck, and a binder mechanism comprising a needle movable across the path of said stalks, an operating shaft on which said needle is mounted to turn therewith but is capable of sliding lengthwise, and means for adjusting said needle lengthwise on said shaft comprising a carriage having a guide sleeve, arms projecting laterally from said sleeve and provided with eyes which engage with opposite ends of the hub of said needle, and a screw nut arranged on one of said arms, a stationary guide rod on which said sleeve is mounted to slide lengthwise, an adjusting screw shaft having its threaded portion engaging with said screw nut, and fixed bearings in which said screw shaft turns but is held against axial movement.

4. A harvester comprising a binder deck, a feeding mechanism for moving the stalks past said deck, and a binder mechanism comprising a needle movable across the path of said stalks, an operating shaft on which said needle is mounted to turn therewith but is capable of sliding lengthwise, and means for adjusting said needle lengthwise on said shaft comprising a carriage having a guide sleeve, arms projecting laterally from said sleeve and provided with eyes which engage with opposite ends of the hub of said needle, and a screw nut arranged on one of said arms, a stationary guide rod on which said sleeve is mounted to slide lengthwise, an adjusting screw shaft having its threaded portion engaging with said screw nut, and having one of its ends constructed to receive a crank or handle, and fixed bearings in which said screw shaft turns but is held against axial movement.

Witness our hands this 29th day of May, 1914.

GEORGE A. FARRALL.
CHRISTIAN MAUL.

Witnesses:
LEWIS D. COLLINS,
WILLIS R. MAUL.

Copies of this patent may be obtained for five cents each, by addressing the "Commissioner of Patents, Washington, D. C."